April 5, 1960
H. D. KLEIN
2,931,046
CAP VISOR REINFORCEMENT
Filed Nov. 18, 1955
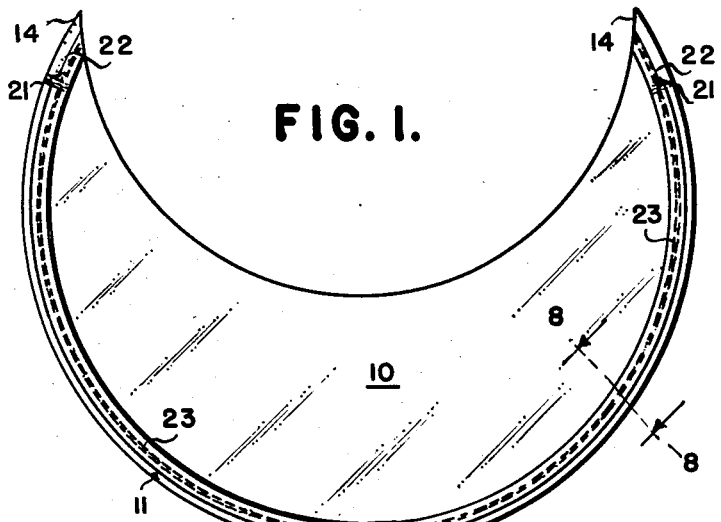
FIG. 1.
FIG. 2.
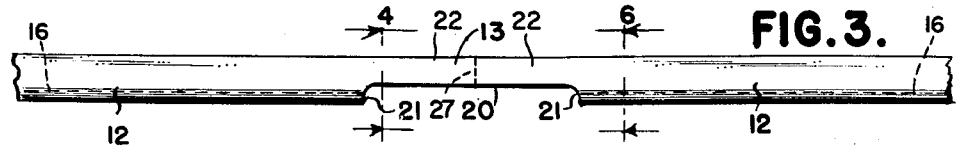
FIG. 3.
FIG. 4. FIG. 5. FIG. 6.
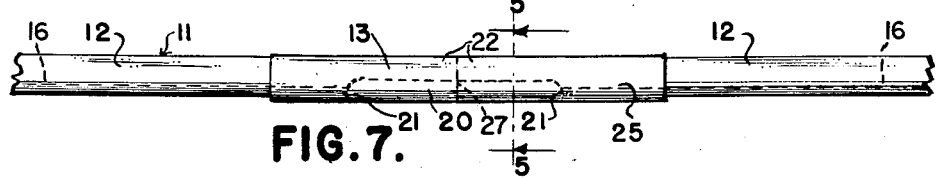
FIG. 7.
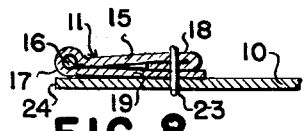
FIG. 8.
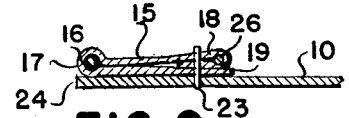
FIG. 9.
HERBERT D. KLEIN
INVENTOR.
Abraham Friedman
Atty.

United States Patent Office 2,931,046
Patented Apr. 5, 1960

2,931,046

CAP VISOR REINFORCEMENT

Herbert D. Klein, New York, N.Y.

Application November 18, 1955, Serial No. 547,597

1 Claim. (Cl. 2—195)

This invention relates to improvements in cap visors and hat brims.

Cap visors and hat brims are frequently subjected to tugging and shaping to effect various configurations either for aesthetic purposes or otherwise. For example, a cap visor when shaped properly can serve as a sun shade or rain shield. However, when protection from sun or rain is not necessary, the user by adjusting the position or shape of the visor can create a variety of head gear styles to please his aesthetic tastes. Consequently an efficient, practical hat brim or cap visor must be both durable and deformable.

In the instant invention a durable decorative cap visor construction is provided which can be easily deformed to assume and retain almost any shape desired. The visor is provided with a decorative stiffener trim mounted along the visor periphery. The said trim includes a deformable wire embedded internally within the trim material. The wire permits visor deformation and also retains the visor in any desired configuration.

Although the invention is more particularly disclosed in relation to cap visors in the ensuing detailed description, it will be apparent that the invention is equally applicable to hat brims.

Consequently a primary object of this invention is the provision of a deformable hat brim or cap visor which is durable, economical to manufacture and which will hold any shape which the user desires.

Another object of this invention is the provision of a cap visor having a decorative trim mounted along the visor periphery which will permit convenient visor deformation to desired configurations and which will also retain the visor in these said configurations and wherein the said trim reinforces the visor periphery to retard wear and tear of the visor.

A further object of this invention is the provision of an elongated deformable trim for a cap visor which when mounted along the peripheral edge of a flexible cap visor will reinforce the visor edge, and permit the user to bend the cap visor into a variety of shapes with the trim retaining the visor in any of the shapes desired.

A still further object of this invention is an elongated ribbon of material for stiffening and reinforcing the peripheral edge of a cap visor wherein a plurality of equal predetermined lengths of stiffener units can be successively severed from the ribbon.

A still further object of this invention is the provision of an elongated ribbon comprising a series of integrally connected units of stiffeners adapted to reinforce the peripheral edge of a cap visor, wherein each unit includes a relatively long central reinforced portion and terminal short unreinforced flaps permitting the ribbon to be severed into a plurality of idential units each adapted to be mounted along the peripheral edge of a cap visor of predetermined dimension.

Additional objects and novel features of the invention will become apparent from the following detailed description when read in conjunction with the attached drawings in which:

Figure 1 is a plan view of a cap visor incorporating the novel stiffener;

Figure 2 is a plan view of the trim material showing the relatively short unreinforced flaps occurring regularly between the longer reinforced portions;

Figure 3 is an enlarged plan view of the stiffener material showing with greater clarity the difference in appearance between the reinforced portions and the reduced unreinforced flap portions;

Figure 4 is a partial section through 4—4 of Figure 3 showing the construction of the stiffener material at the unreinforced portions;

Figure 5 is a similar section through plane 5—5 of Figure 7 showing a modified construction of the unreinforced portions;

Figure 6 is a partial section through plane 6—6 of Figure 3 showing details of construction of the reinforced portion of the stiffener material;

Figure 7 is a plan view of a modified form of stiffener construction showing a variation in the construction of the unreinforced portions;

Figure 8 is a transverse section through plane 8—8 of Figure 1 showing additional details of the stiffener construction as related to the cap visor material; and Figure 9 is action similar to Figure 8 showing a modified form of stiffener material construction whereby the inner edge of the material is shaped and reinforced with a thread or the like.

Referring now to Figure 1, there is depicted a cap visor 10, formed of a flexible material such as carboard or the like, provided with a stiffener unit 11 mounted along the peripheral edge of the visor. Although the stiffener is preferably mounted by stitching, other conventional applicable means may be utilized.

The stiffener unit seen in Figure 1 is cut from an elongated ribbon comprising a series of integrally connected units of predetermined length. In Figure 2 a portion of such a ribbon is shown to include alternately longer and wider reinforced portions 12 and shorter, narrower unreinforced portions 13, disposed at regular intervals between the reinforced portions. The center to center distance between the unreinforced portions 13 is predeterminately constant for any specific ribbon and is governed by the dimensions of the visor which is to receive the stiffener units. Consequently by cutting the ribbon through the centers of portions 13 along the broken line indicated by the numeral 27, a plurality of identical stiffener units are provided; each unit will include a reinforced portion 12 and a flap 22 comprising one half of the unreinforced portion 13 at each end. The unreinforced portions 13 are secured to the crescent shaped visor ends 14, that is, where the outer peripheral edge of the visor meets the body of the cap.

The general construction of the stiffener unit 11 is better seen in Figure 8 to comprise an elongated rectangular strip 15 of paper, cloth, thin cardboard, plastic, or the like folded about a longitudinally disposed deformable wire 16 to form on one side a circular bead 17 of longitudinal extent. The upper folded side 18 of the strip 15 is again folded adjacent its outer edge inwardly towards the wire 16 and compressed against the lower side 19 of the strip 15 thereby forming a three ply thickness along the strip edge opposite the bead 17. The assembly is completed by applying an adhesive beween the contacting surface of sides 18 and 19. The material surrounding the wire 16 is crimped tightly over the wire and the multi-ply remainder of the strip 15 is compressed to form a substantially planar extension from the bead 17 especially adapted for the ensuing stitching operation. The foregoing construction applies only to the reinforced portions 12. At the unreinforced portions 13 (see Figures 3 and 4) the strip material surrounding the bead 17 is cut out leaving only the outer portions of sides 18 and 19 which are homogeneously continuous throughout the ribbon. The wire 16 is obviously discontinued at the cut out portions 20 whereby the opposing ends 21 (Figure 3) of adjacent reinforced portions are interconnected solely by the strip material.

The reduced widths of the unreinforced portions 13 unmistakably mark the points where the ribbon is to be severed to provide individual stiffener units. As previously stated the ribbon is cut along the center of the portions 13 thereby providing each stiffener unit with terminal unreinforced flaps 22, half the length of portions 13. The flaps 22 (Figure 1) are thus conveniently secured to the ends 21 of the wire (in the reinforced portion) to be safely spaced from the body of the cap and the user's head.

The stiffener units 11 are then each mounted securely on the visor material by stitching 23 as shown in Figures 1 and 8. The stitching runs continuously through the ribbon including portions 13.

The wire enveloped in the reinforced portions of the stiffener can easily be bent to assume any desired contour. Moreover, wire of the diameter utilized herein does not possess sufficient resiliency to cause the wire to return even partially to the shape it had prior to bending. Consequently a visor equipped with one of the stiffener units can be adjusted to assume a great variety of shapes and positions. The embedded wire retains the visor in any of the desired shapes until a new adjustment is made. By varying the color of the stiffeners, the units can also be used as a decorative trim blending in with the visor design. The wire reinforced bead 17 reinforces the leading edge 24 of the visor material and helps to prevent extensive fraying of the visor edges.

The stiffener construction described above can be readily manufactured by economical mass production techniques. Both the wire and the strip material can be fed from continuous reels and automatic means can therefore be efficiently utilized to place the wire within the folds of the strip material and adhesively stamp the resultant assembly together. The elongated ribbon so formed is then passed through a cutting die which automatically cuts out or notches the strip at the desired spaced intervals to thereby remove the reinforcing wire therefrom while maintaining the ribbon in continuous form by reason of the retention of the unreinforced portions 13. The ribbon is then reeled and in that form it is ready to be applied to the visor as by sewing. By providing the ribbon in continuous form the sewing operation is materially facilitated and results in substantial economies from the saving of time, manipulation and labor. The operator is not required to select, position and feed individual strips but may continuously sew the ribbon on to the visor edge merely placing additional visor blanks under the sewing head as required. The unreinforced portions of the strip will automatically register with the visor ends 14 and the reinforcing wire will automatically be positioned the desired distance inwardly from the end. When the modification shown in Figure 7 is employed the additional strengthening strip 25 will also register with the visor ends 14. When a number of visors have thus received the reinforcing ribbon they may be readily cut apart by merely severing the strip material at the visor ends. Thus, a continuous time and labor saving operation in applying the reinforcing ribbon is made possible by the provision of the reinforcement in continuous strip form in the manner heretofore indicated.

In Figure 7 another embodiment of ribbon construction is depicted wherein the unreinforced section 13 is strengthened by the addition of a U-shaped strip 25 which encloses symmetrically the cut out portion 20 and overlaps terminally the adjoining reinforced ends 21. The U-shaped strips 25 which can readily be identified mark the point where the ribbon is to be cut. Moreover in handling the ribbon as it is subjected to the various fabrication processes, there is less likelihood of unwanted tearing at the unreinforced portions. Strip 25 is advantageously applied to the ribbon immediately after the wire removal operation referred to above.

In Figure 9 a further variation in construction is shown wherein a thread 26 is enveloped longitudinally within the inner edge 18 of the strip material. In addition to reinforcing the said inner edge, the rounded edge resulting from the thread presents a more decorative appearance.

It is apparent from the foregoing disclosure that the instant invention provides a cap visor which is reinforced at the outer edges and which will retain any specific shape that the user desires by merely bending the visor. Moreover the stiffener strip which is utilized to provide the visor with these properties is economical to fabricate and can be expeditiously mounted on the visor by sewing or the like. The reinforced cap visor can be used in the form indicated or may then be covered by fabric or similar materials as is conventional in the industry.

Although the disclosed embodiments are preferred forms, it must be realized that other forms resulting from changes in size, shape, material, arrangement, etc. are within the scope of this invention.

Having duly described in detail the nature of the invention, a grant of Letters Patent is desired for the novelty as defined in the following claim.

I claim:

A stiffener for cap visors comprising a strip of flexible material, an elongated reinforcing wire and a longitudinal thread, said strip being folded about said wire to provide upper and lower sides extending laterally from the wire, said strip extending beyond the ends of the wire to form unreinforced terminal flaps, means for securing the sides together to form a multi-ply planar extension from the wire adapted to receive stitching, said strip material being crimped about the wire to form a longitudinal bead and being adapted to be superimposed upon the outer visor edge and the said extension being adapted to be stitched to the visor along a seam line spaced from and parallel to the bead, one of said sides being folded inwardly about said thread parallel to said wire.

References Cited in the file of this patent

UNITED STATES PATENTS

| | | |
|---|---|---|
| 185,093 | Fettis | Dec. 5, 1876 |
| 299,024 | Sheplie | May 20, 1884 |
| 302,641 | Solmans | July 29, 1884 |
| 346,593 | Lawrence et al. | Aug. 3, 1886 |
| 494,064 | Johnston | Mar. 21, 1893 |
| 870,988 | Newcomb | Nov. 12, 1907 |
| 970,175 | Brooks | Sept. 13, 1910 |
| 1,040,790 | Sherman | Oct. 8, 1912 |
| 1,365,731 | Schloss | Jan. 18, 1921 |
| 1,558,142 | Brenner | Oct. 20, 1925 |
| 1,984,521 | Deegan | Dec. 18, 1934 |
| 2,583,225 | Murphy | Jan. 22, 1952 |

FOREIGN PATENTS

| | | |
|---|---|---|
| 233,604 | Great Britain | May 14, 1925 |